(12) United States Patent
Ma

(10) Patent No.: US 10,594,370 B2
(45) Date of Patent: Mar. 17, 2020

(54) FREQUENCY DIVISION MULTIPLE ANTENNA DISTRIBUTION

(71) Applicant: Futurewei Technologies, Inc., Plano, TX (US)

(72) Inventor: Zhengxiang Ma, Summit, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/115,349

(22) Filed: Aug. 28, 2018

(65) Prior Publication Data

US 2019/0007109 A1    Jan. 3, 2019

Related U.S. Application Data

(63) Continuation of application No. 15/399,323, filed on Jan. 5, 2017, now Pat. No. 10,090,893.

(Continued)

(51) Int. Cl.
*H04B 7/0426* (2017.01)
*H04W 52/42* (2009.01)
(Continued)

(52) U.S. Cl.
CPC .......... *H04B 7/0426* (2013.01); *H01Q 21/00* (2013.01); *H04B 7/0408* (2013.01);
(Continued)

(58) Field of Classification Search
CPC .. H04B 7/0426; H04B 7/0408; H04B 7/0626; H04B 7/12; H01Q 21/00; H04L 5/0023;
(Continued)

(56) References Cited

U.S. PATENT DOCUMENTS 9,548,805 B2 * 1/2017 Moshfeghi ............ H04W 84/00
2007/0258357 A1   11/2007 Akita
(Continued)

FOREIGN PATENT DOCUMENTS

CN    1604511 A    4/2005
CN   105356921 A    2/2016
(Continued)

OTHER PUBLICATIONS

U.S. Appl. No. 15/399,323, Final Office Action dated Dec. 22, 2017, 13 pgs.
(Continued)

*Primary Examiner* — Janice N Tieu
(74) *Attorney, Agent, or Firm* — Schwegman Lundberg & Woessner, P.A.

(57) ABSTRACT

An apparatus of a base station can include an antenna array comprising a plurality of antenna elements, and processing circuitry coupled to the antenna array. The processing circuitry is configured to perform operations including generating a plurality of sub-carrier signals using a carrier signal. A sub-carrier pattern formed from a subset of the plurality of sub-carrier signals is selected. Each signal in the subset of sub-carrier signals corresponds to a different antenna element in a subset of the plurality of antenna elements. The sub-carrier signals are transmitted using the subset of antenna elements. Each of the sub-carrier signals is transmitted with a transmission power corresponding to a transmission weight of a plurality of transmission weights. During the transmitting, the sub-carrier pattern is transitioned throughout the antenna array to adjust the transmission power for each of the sub-carrier signals in the sub-carrier pattern.

20 Claims, 8 Drawing Sheets

Related U.S. Application Data

(60) Provisional application No. 62/438,238, filed on Dec. 22, 2016.

(51) Int. Cl.

| | |
|---|---|
| *H04L 5/00* | (2006.01) |
| *H04L 27/26* | (2006.01) |
| *H01Q 21/00* | (2006.01) |
| *H04B 7/0408* | (2017.01) |
| *H04B 7/06* | (2006.01) |
| *H04B 7/12* | (2006.01) |
| *H04W 72/04* | (2009.01) |

(52) U.S. Cl.
CPC ............. *H04B 7/0626* (2013.01); *H04B 7/12* (2013.01); *H04L 5/005* (2013.01); *H04L 5/0023* (2013.01); *H04L 27/2602* (2013.01); *H04W 52/42* (2013.01); *H04W 72/042* (2013.01); *H04L 5/0057* (2013.01); *H04L 27/26* (2013.01)

(58) Field of Classification Search
CPC ... H04L 5/005; H04L 27/2602; H04L 5/0057; H04L 27/26; H04W 52/42; H04W 72/042
See application file for complete search history.

(56) References Cited

U.S. PATENT DOCUMENTS

| | | |
|---|---|---|
| 2008/0214128 A1 | 9/2008 | Lim et al. |
| 2009/0290517 A1 | 11/2009 | Rao et al. |
| 2011/0261841 A1 | 10/2011 | Lee |
| 2012/0182895 A1 | 7/2012 | Jwa |
| 2013/0188677 A1 | 7/2013 | Howard et al. |
| 2015/0163683 A1 | 6/2015 | Namgoong et al. |
| 2016/0050003 A1* | 2/2016 | Ko .................. H04B 7/0469 370/329 |
| 2016/0191215 A1 | 6/2016 | Lee et al. |
| 2017/0105112 A1 | 4/2017 | Park et al. |
| 2017/0188379 A1* | 6/2017 | Shtrom ............ H04B 17/102 |
| 2018/0183499 A1 | 6/2018 | Ma |

FOREIGN PATENT DOCUMENTS

| | | |
|---|---|---|
| CN | 105637773 A | 6/2016 |
| WO | WO-2006137627 A1 | 12/2006 |
| WO | WO-2012057663 A1 | 5/2012 |

OTHER PUBLICATIONS

U.S. Appl. No. 15/399,323, Non Final Office Action dated Aug. 2, 2017, 13 pgs.
U.S. Appl. No. 15/399,323, Notice of Allowance dated May 29, 2018, 11 pgs.
U.S. Appl. No. 15/399,323, Response filed Mar. 16, 2018 to Final Office Action dated Dec. 22, 2017, 9 pgs.
U.S. Appl. No. 15/399,323, Response filed Oct. 31, 2017 to Non Final Office Action dated Aug. 2, 2017, 12 pgs.
International Application Serial No. PCT/CN2017/114639, International Search Report dated Mar. 9, 2018, 4 pgs.
International Application Serial No. PCT/CN2017/114639, Written Opinion dated Mar. 9, 2018, 4 pgs.

\* cited by examiner

FREQUENCY DIVISION MULTIPLE ANTENNA DISTRIBUTION

PRIORITY APPLICATION

This application is a continuation of and claims the benefit of priority under 35 U.S.C. § 120 to U.S. patent application Ser. No. 15/399,323, filed on Jan. 5, 2017, which claims the benefit of U.S. Provisional Application Ser. No. 62/438,238, filed on Dec. 22, 2016 which application is incorporated by reference herein in its entirety.

FIELD OF THE INVENTION

The present disclosure is related to multiple input multiple output (MIMO) antenna systems, and in particular to frequency division multiple antenna distribution in a massive MIMO system.

BACKGROUND

In Long Term Evolution (LTE) systems, a cell specific reference signal (CRS) can be used by the evolved Node B (eNB) to enable the user equipment (UE) to perform downlink channel estimations for cell association and demodulation of channels. CRS is limited to four ports and needs to provide full coverage for the entire cell.

MIMO is a method for multiplying the capacity of a radio link between the eNB and the UE using multiple transmit and receive antennas to exploit multipath propagation. MIMO refers to a practical technique for sending and receiving more than one data signal simultaneously over the same radio channel by exploiting multipath propagation. MIMO is fundamentally different from smart antenna techniques developed to enhance the performance of a single data signal, such as beamforming and diversity.

Using MIMO techniques in LTE results in a problem with distribution of the CRS power over multiple antenna elements in order to fully utilize available power amplifier resources in the eNB. Additionally, UE channel estimation for multiple transmit antennas using CRS is not possible due to the CRS being broadcast on a large number of antennas.

SUMMARY

Various examples are now described to introduce a selection of concepts in a simplified form that are further described below in the detailed description.

One example is a system comprising an antenna array with a plurality of sub-arrays, each sub-array comprising a plurality of antenna elements. One or more processors are coupled to the antenna array, wherein the one or more processors are configured to: divide a carrier signal into a plurality of distinct sub-carrier signals, each sub-carrier signal comprising one or more frequencies; transmit the sub-carrier signals with respective first and second adjacent antenna elements, the first antenna element having a first transmission power and the second antenna element having a second transmission power; and during the transmitting, decreasing the first transmission power of the first antenna elements while increasing the second transmission power of the second antenna elements until the first and second transmission powers satisfy respective thresholds.

Another example includes a method for frequency division multiple antenna distribution of a signal. The method includes dividing a carrier signal into a plurality of distinct sub-carrier signals, each sub-carrier signal comprising one or more frequencies. The sub-carrier signals are transmitted with respective first and second adjacent antenna elements, the first antenna element having a first transmission power and the second antenna element having a second transmission power. During the transmitting, the first transmission power of the first antenna elements is decreased while increasing the second transmission power of the second antenna elements until the first and second transmission powers satisfy respective thresholds.

In yet another example, a non-transitory computer-readable media stores computer instructions for frequency division multiple antenna distribution that, when executed by one or more processors, cause the one or more processors to perform the steps of: divide a carrier signal into a plurality of distinct sub-carrier signals, each sub-carrier signal comprising one or more frequencies; transmit the sub-carrier signals with respective first and second adjacent antenna elements, the first antenna element having a first transmission power and the second antenna element having a second transmission power; and during the transmitting, decreasing the first transmission power of the first antenna elements while increasing the second transmission power of the second antenna elements until the first and second transmission powers satisfy respective thresholds.

DETAILED DESCRIPTION

Cell-specific reference signals (CRS) are defined in the LTE standard as being transmitted in all downlink (i.e., eNB to UE) sub-frames from a cell supporting physical downlink shared channel (PDSCH) transmission. CRS can be used for cell search and initial acquisition, downlink channel estimation for coherent demodulation/detection at the UE, and downlink channel quality measurements. Conventionally, CRS are transmitted on one or more of antenna ports 0 to 3, where each antenna port has a unique CRS associated with it. Each antenna port usually drives one transmit receive unit (TXRU) that, in turn, drives a set of antenna elements to produce a wide beam to provide uniform coverage over most of the cell coverage area. This presents a problem in a Massive MIMO system in which a large number of TXRUs (much greater than the number of CRS ports) are used to drive a large number of antenna array elements in one array. The challenge is to distribute the few CRS ports among the much larger number of TXRUs and produce broad beams with maximum utilization of the TXRU output power capability.

The Frequency Division Multiple Antenna Distribution (FDMAD) method divides the carrier up in the frequency domain and distributes the various frequencies among the multiple antenna elements of the antenna array for transmission. The description of the FDMAD method as applied to the CRS from the base station is for purposes of illustration only. The FDMAD may be applied to other signals transmitted over a wireless channel.

Figure 1:
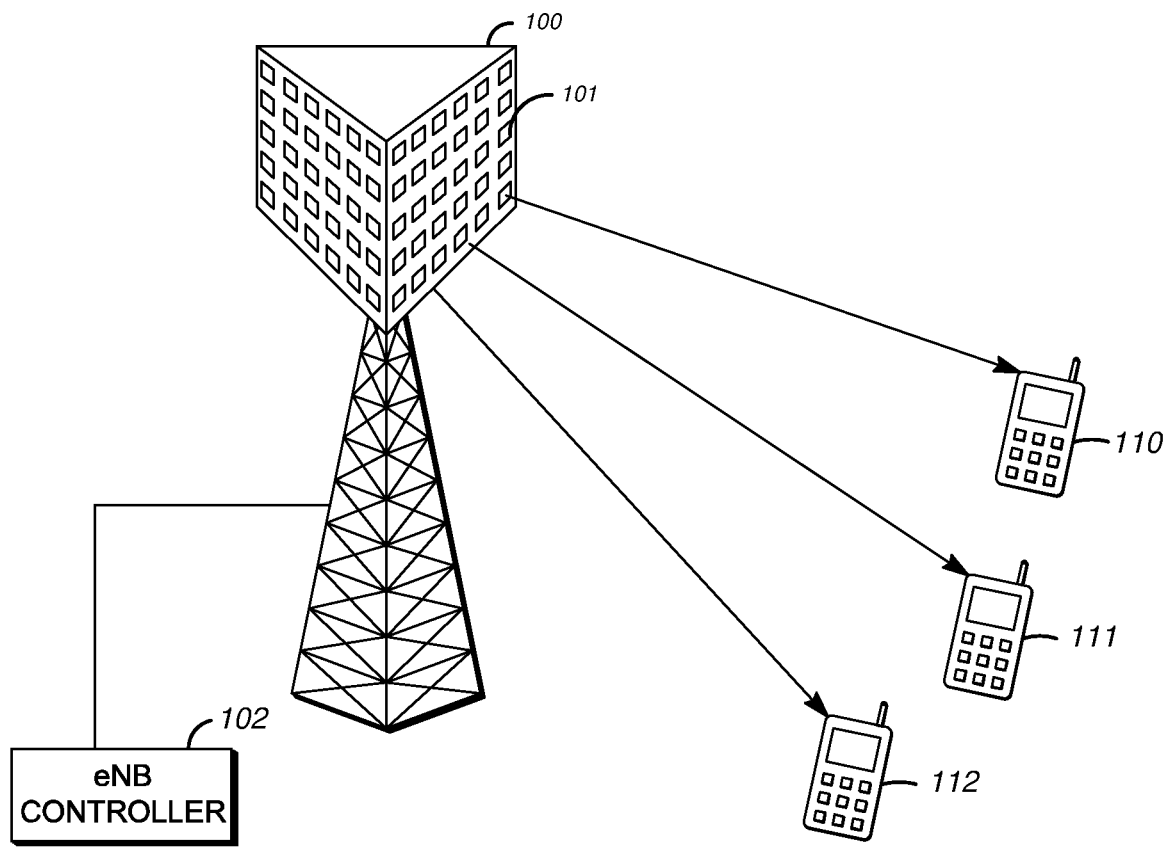
FIG. 1 is a diagram of a communication system, according to various embodiments.

FIG. 1 is a diagram of a communication system, according to various embodiments. The system includes a base station (eNB) that comprises an antenna array 100 coupled to an eNB controller 102. An embodiment of a controller is illustrated in FIG. 2 and discussed subsequently.

The antenna array 100 is illustrated as being an array with a plurality of antenna elements 101. An antenna element may be defined as any part of an antenna that can be actively used for the reception or transmission of signals. The controller 102 includes transmitters and receivers for transmitting signals to, and receiving signals from, each of the plurality of antenna elements 101. In various embodiments, each antenna element 101 is coupled to a separate transmitter and receiver such that transmission power can be controlled for every antenna element. Each element 101 of the antenna array 100 can transmit a signal, such as a CRS, to UEs 110-112 as shown.

Figure 3:
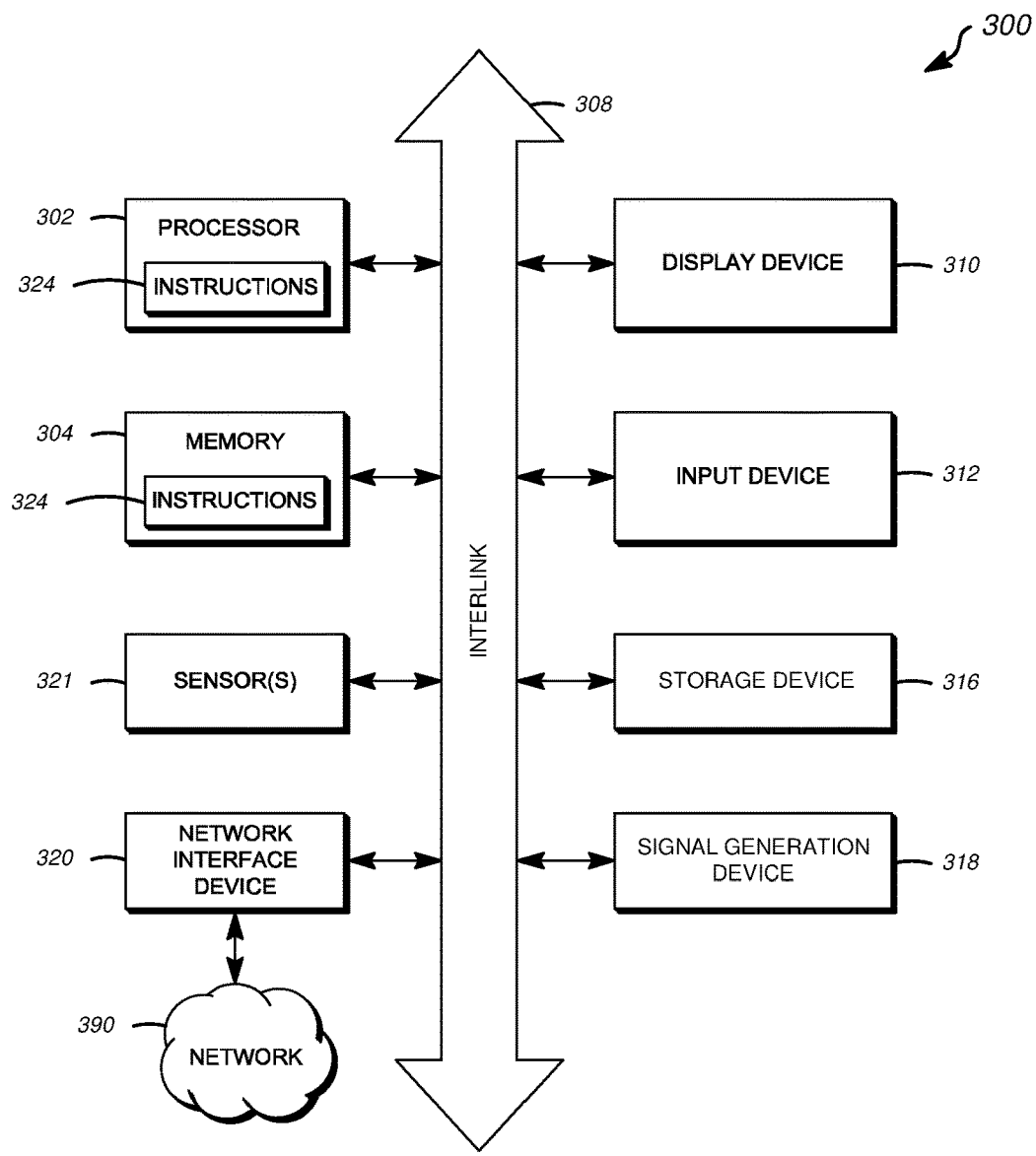
FIG. 3 is a block diagram of a UE for implementing algorithms and performing methods, according to various embodiments.

The system further includes one or more UEs 110, 111, 112. The UEs 110-112 can be terminals, computers, smartphones, cellular phones, or other electronic devices configured to communicate over a wireless channel. One example of a UE is illustrated in FIG. 3 and discussed subsequently.

Figure 2:
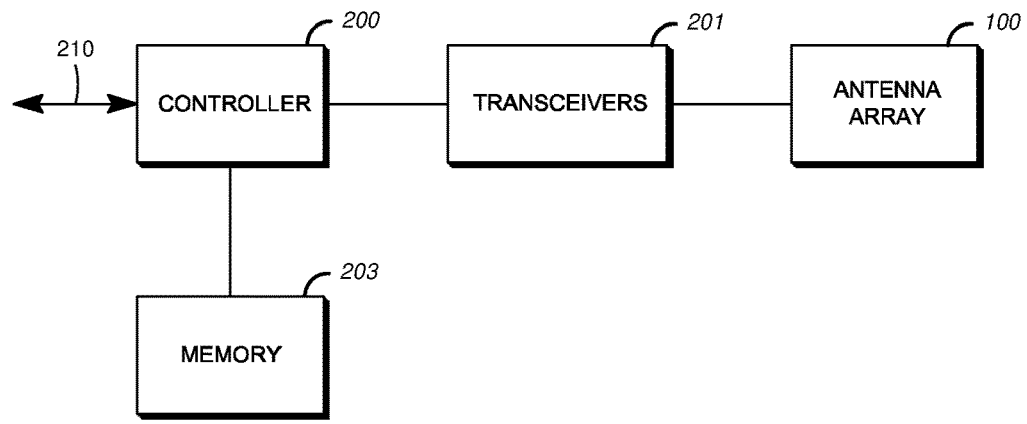
FIG. 2 is a block diagram of an eNB for implementing algorithms and performing methods, according to various embodiments.

FIG. 2 is a block diagram of an eNB for implementing algorithms and performing methods, according to various embodiments. This block diagram is a simplified, functional block diagram that illustrates the basic functions of an eNB. Other embodiments can use different block diagrams without departing from the scope of the disclosure.

A controller 200 is responsible for controlling operation of the eNB. The controller 200 is coupled to memory 203 that can store data for transmission over the wireless channels, data that has been received from the wireless channels, and/or software for execution to operate the eNB based on any methods disclosed herein. The controller can comprise one or more processors that are central processing units (CPUs), microprocessors, dedicated controllers, or some other control circuitry.

The controller 200 is also coupled to a landline communication line 210. The landline communication line 210 provides access for the eNB to other networks.

The controller 200 is further coupled to transceivers 201 (e.g., transmitters, receivers) that are coupled to the antenna elements 101 of the antenna array 100, as illustrated in FIG. 1. The transceivers 201 provide the transmit power, modulation, demodulation, and other functions necessary to communicate over a wireless channel as disclosed herein.

FIG. 3 is a block diagram of a UE 300 for implementing algorithms and performing methods, according to various embodiments. The UE 300 can also be referred to as a computer to execute any methods disclosed herein. This block diagram is for purposes of illustration only as other systems can have a different architecture and still be able to implement any methods disclosed herein.

The UE 300 can include a processor 302 (e.g., a central processing unit (CPU), a graphics processing unit (GPU), a processor core, or any combination thereof), and memory 304. The various elements of the computer can communicate with each other over an interlink (i.e. bus) 308.

The memory 304 can include at least one non-transitory computer-readable medium on which is stored one or more sets of data structures or instructions 324 (e.g., software) embodying or utilized by any one or more of the techniques, methods, or functions described herein. The instructions 324 can also reside, at least partially, in additional computer-readable memories such within the processor 302 during execution thereof by the UE 300.

One or any combination of the processor 302, the memory 304 or the mass storage device 316 can constitute non-transitory computer-readable media. The software can reside on a non-transitory computer readable medium. The software, when executed by the underlying hardware of the module, causes the hardware to perform the specified operations.

The memory 304 can include volatile memory and/or non-volatile memory. For example, the memory 304 can include one or more of random access memory (RAM), read only memory (ROM), erasable programmable read-only memory (EPROM) and electrically erasable programmable read-only memory (EEPROM), flash memory or other memory technologies.

The UE 300 can further include a display unit 310 and an alphanumeric input device 312 (e.g., a keypad) coupled to the interlink 308. In an example, the display unit 310 and the input device 312 together can be a touchscreen display. The touchscreen display can be incorporated in a tablet computer or smartphone device.

The UE 300 can additionally include a storage device 316 (e.g., flash memory, random access memory (RAM), read only memory (ROM), magnetic disk drive, optical disk drive), a signal generation device 318 (e.g., a speaker), a sensor and network interface device 320, and one or more sensors 321. As described previously, the sensors can include position and movement sensors such as accelerometers, compasses, gyroscopes, altimeters, barometers, thermometers, vertical speed sensors, and/or GPS sensors.

The network interface device 320 can include any necessary circuits for communicating over a wireless or wireline channel. For example, the network interface device 320 can include one or more radio frequency transmitters and/or receivers (i.e., radios).

The radios can operate using global system for mobile communication (GSM), code division multiple access (CDMA), Bluetooth®, IEEE 802.11, LTE, or any other standard for communication over a wireless channel. The network 390 can be a cellular network, peer-to-peer network, a local area network (LAN), or a wide area network (WAN) including the Internet.

Figure 4:
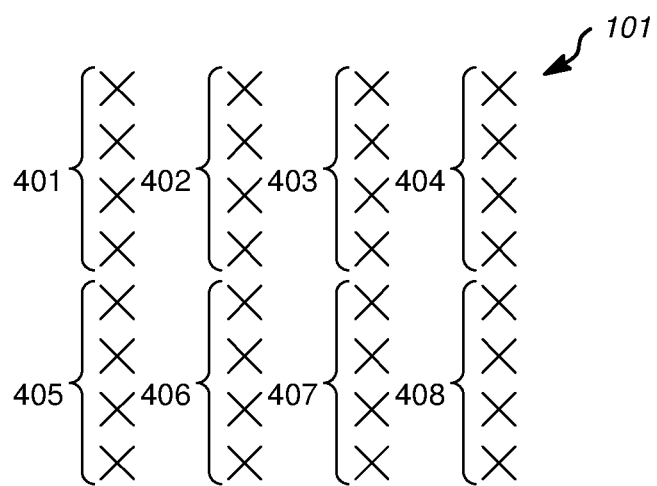
FIG. 4 is a diagram of an antenna array that is divided into sub-arrays, according to various embodiments.

FIG. 4 is a diagram of an antenna array illustrating frequency division multiple antenna distribution (FDMAD) of a signal, according to various embodiments. Each "X" represents an antenna element 101 as illustrated in FIG. 1. The frequency distribution pattern shown in FIG. 4 is for purposes of illustration only. Other embodiments can use other patterns.

As shown in FIG. 4, an antenna array is divided into multiple sub-arrays 401-408, each sub-array 401-408 consists of one or more antenna elements 101. A frequency band (e.g., carrier frequency) is divided up into frequency segments (e.g., sub-carriers) and assigned to specific antenna sub-arrays. Each frequency segment can comprise one particular frequency or a range of frequencies. The range of frequencies, in an embodiment, can overlap with frequencies assigned to other frequency segments. In various embodiments the sub-carrier is a Channel State Information Reference Signal (CSI-RS) and is used by UEs to estimate the channel and report channel quality information to the base station As one example, frequency segment 1 can be assigned to antenna sub-array 401, frequency segment 2 can be assigned to antenna sub-array 402, frequency segment 3 can be assigned to antenna sub-array 403, frequency segment 4 can be assigned to antenna sub-array 404, frequency segment 5 can be assigned to antenna sub-array 405, frequency segment 6 can be assigned to antenna sub-array 406, frequency segment 7 can be assigned to antenna sub-array 407, and frequency segment 8 can be assigned to antenna sub-array 408. The frequency segments can be static over time and variable over the sub-carriers, as illustrated in FIG. 5, or variable in both time and frequency, as illustrated in FIG. 6.

Figure 5:
FIG. 5 is a diagram showing a time-static distribution of FDMAD signals among the sub-arrays illustrated in FIG. 4.

FIG. 5 is a diagram showing a time-static distribution of FDMAD signals among the sub-arrays illustrated in FIG. 4. This plot shows time along the x-axis and frequency along the y-axis. The various frequencies assigned to the antenna sub-array of FIG. 4 are shown in this plot. The plot shows the signal (e.g., CRS) divided up by frequency and not time. Thus, the sub-carrier assignment in this figure is shown as not changing over time.

Figure 6:
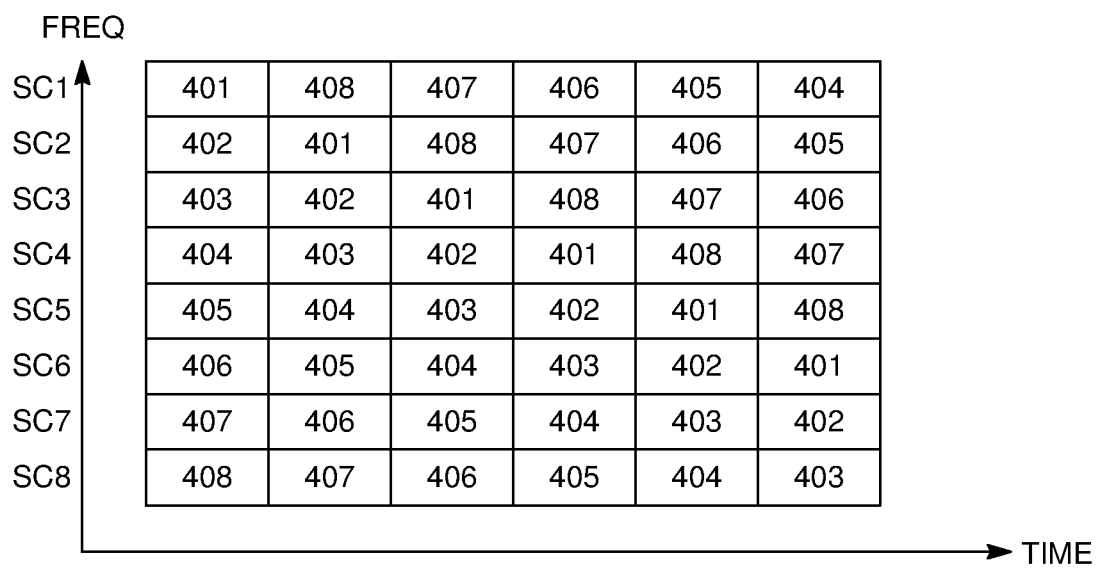
FIG. 6 is a diagram showing a time varying distribution of FDMAD signals among the sub-arrays illustrated in FIG. 4.

FIG. 6 is a diagram showing the FDMAD signals that are variable over both frequency and time, according to the shifting distribution of FIG. 4. The time is shown along the x-axis and carrier frequency is shown along the y-axis.

Each row represents a different sub-carrier frequency as illustrated by different sub-carrier numbers (e.g., SC1, SC2, SC3, SC4, SC5, SC6, SC7, SC8). Thus, it can be seen in the antenna sub-array 401 that, at a first time, the antenna sub-array is assigned SC1. At a second time, the antenna element is assigned SC2. At a third time, the antenna element is assigned SC3. At a fourth time, the antenna element is assigned SC4. At a fifth time, the antenna element is assigned SC5. At a sixth time, the antenna element is assigned SC6. These assignments are for purposes of illustration of the assignment function and do not limit the invention to only these assignments.

Moving the sub-carriers around the antenna array results in each particular antenna element eventually transmitting the full frequency band over a time period necessary for each of the sub-carriers to be shifted through that particular antenna element.

In one embodiment, the sub-carriers are simply shifted from one antenna element to another. In another embodiment, the shifting is accomplished gradually over a period of time by shifting the weighting of a particular sub-carrier from one antenna element to another antenna element.

As used herein and according to various embodiments, the weighting of the sub-carriers is defined as a representation of the transmission power from a particular antenna element. As described subsequently, the weighting shift of a particular sub-carrier from a first antenna element to an adjacent, second antenna element is accomplished by decreasing the transmission power on the first antenna element to a first threshold that, in some embodiments is no power, while increasing the transmission power on the second antenna element to a second threshold that, in some embodiments, is the full transmission power of the antenna element. The shift in transmission power from the first element to the second element can be performed in a linear fashion such that the transmission power on the first element is decreased linearly at a particular rate while substantially simultaneously the transmission power on the second element is increased linearly at the particular rate. In other embodiments, the rate of change may not be linear or may be different between the first element and the second element. In some embodiments, the shifting from the first element to the second element can be carried out over a pre-defined period of time that can range from 1 millisecond to 10 seconds.

Figure 7:
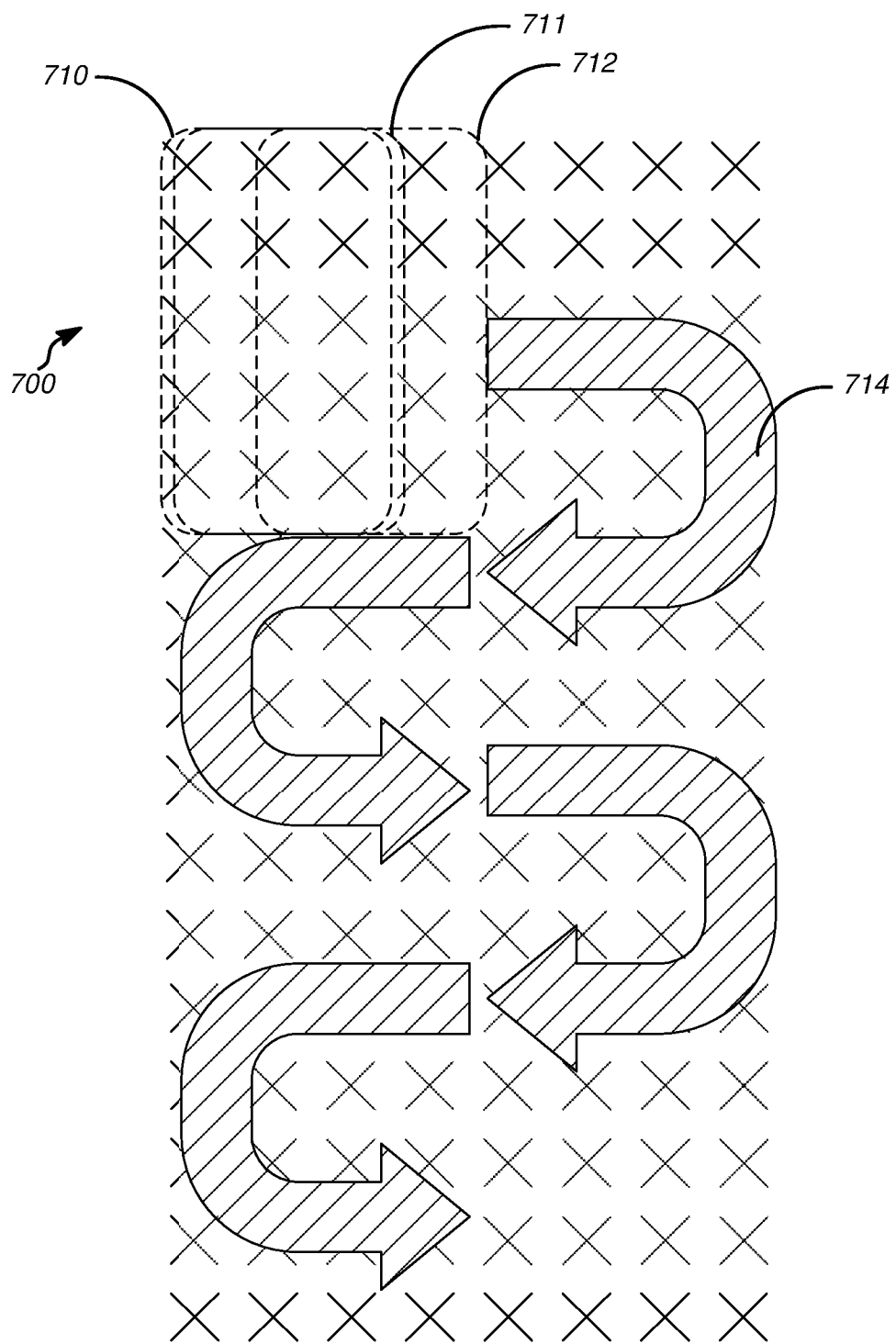
FIG. 7 is a diagram of the antenna array illustrating an FDMAD pattern, according to various embodiments.

FIG. 7 is a diagram of the antenna array illustrating an FDMAD pattern, according to various embodiment. The M by N (e.g., 3×5) antenna sub-array and the pattern of shifting the sub-array for different sub-carriers of FIG. 7 is for purposes of illustration only as other patterns can be used.

The M by N pattern can be determined based on a beam pattern that provides adequate coverage for the entire cell in both horizontal and vertical dimensions. The initially chosen pattern can be chosen based on the number of UEs in the cell, the size of the cell, as well as other factors. For example, the number of vertical elements can be determined by the minimum vertical beam width required to provide coverage for the cell in the elevation dimension. The more elements used, the narrower the vertical beam width is. Same applies to the azimuth dimension. Choosing too large of a pattern (e.g., too many elements) can reduce the beam-forming performance while too small of a pattern (e.g., not enough elements) can result in not enough coverage for all of the cell.

Figure 8:
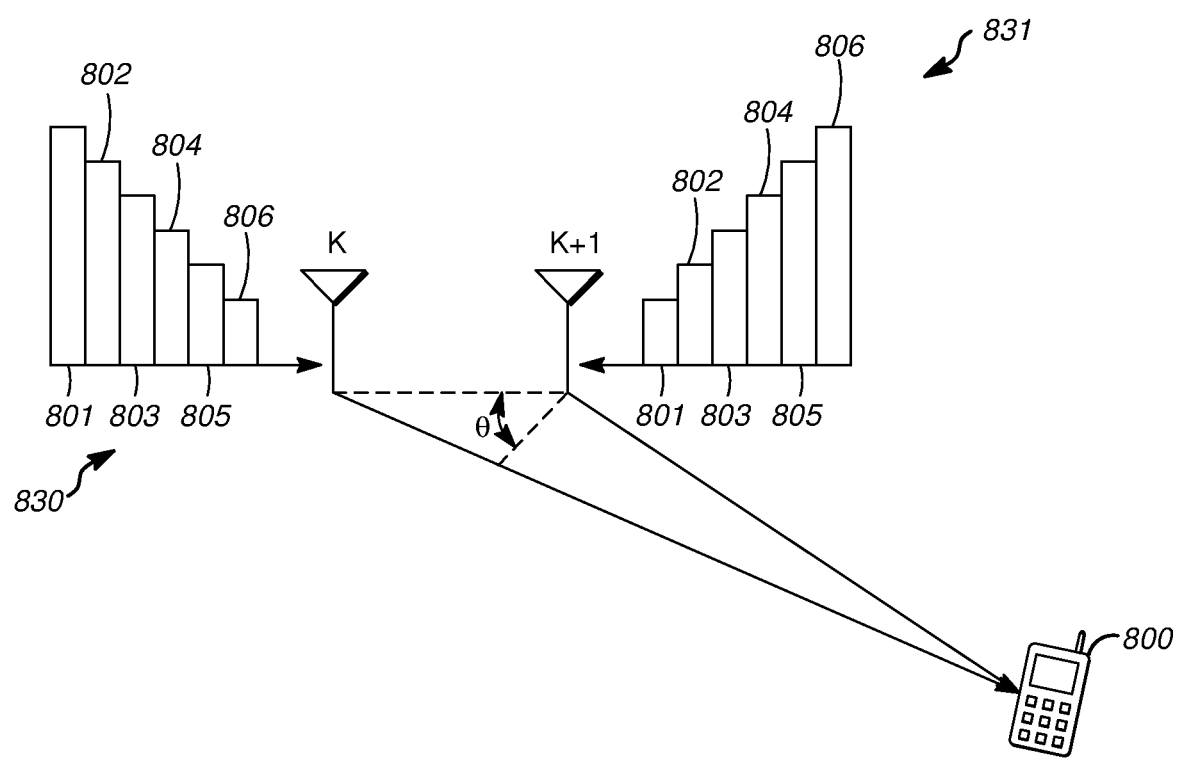
FIG. 8 shows a diagram of two adjacent antenna elements with sub-carrier transition and a UE for channel estimation and angle of departure estimation, according to various embodiments.

FIG. 7 shows an example 3×5 sub-carrier pattern 700. Each sub-carrier is associated with a different antenna element. Reference can be made to FIG. 8 while reviewing FIG. 7 in order to illustrate the changing of the weighting of the sub-carriers as the pattern 700 shifts. This pattern 700 is shown in an initial position 710. The pattern 700 is moved by transitioning the sub-carriers from one antenna element to the next, adjacent antenna (e.g., immediately adjacent) element by distributing the same sub-carrier simultaneously between the two adjacent antenna elements with a gradually changing weight over frequency for each antenna element. In other words, as the sub-carriers are shifted from an initial antenna element to the adjacent antenna element, the weight of the sub-carrier on the adjacent element starts as being less than the weight of the sub-carrier on the initial element. The weighting of the sub-carrier on the initial antenna element decreases substantially simultaneously with the weighting of the sub-carrier on the adjacent antenna element increasing until the sub-carrier has been completely shifted to being used only on the adjacent antenna element.

This is illustrated in FIG. 7 by the shifting of the sub-carrier pattern 700 from the initial position 710 to a second position 711 where the sub-carriers are decreasing on the left side of the pattern 700 while increasing on the right side of the pattern 700. A third position 712 shows the sub-carriers completely shifted over by one column. The arrows 714 show that this transition can be performed throughout the array. The downward shifting of the sub-carrier pattern 700 through rows of antenna elements is substantially the same as the sideways shifting through the columns of antenna elements.

The number of sub-carriers distributed in one horizontal sweep can be represented by p. The number of horizontal sweeps possible in the antenna array can be represented by q. Thus, in some embodiments, the total number of sub-carriers generated from a carrier frequency range can be represented by p×q. The shifting of the sub-carriers has the effect, from the perspective of the UE, of the sub-carrier transmission location gradually moving from one sub-array to another sub-array as the sub-carrier frequency changes without sudden changes in phase.

FIG. 8 shows a diagram of two adjacent antenna elements K, K+1 with sub-carrier transition and a UE 800 for channel estimation and angle of departure estimation, according to various embodiments. One antenna element can be represented by K while the adjacent element can be represented by K+1. The assigned weighting of the sub-carriers 830, 831 to each element are represented by the bars 801-805 next to their respective antenna element K, K+1. For example, sub-carriers 830 represent the weighting of sub-carriers 801-806 on element K and sub-carriers 831 represent the weighting of the same sub-carriers 801-806 on element K+1. The bars can be proportional to the respective transmission power for each sub-carrier on the respective antenna element K, K+1.

It can be seen that sub-carrier 801 on element K has a larger weight in sub-carriers 830 but as it is shifted to element K+1, it has a smaller weight, represented by 801 in sub-carriers 831. This is repeated for the other sub-carriers where it can be seen that sub-carrier 806 has almost completely shifted from element K to element K+1 as represented by the smaller weighting 806 in sub-carriers 830 on element K and the larger weighting 806 in sub-carriers 831 on element K+1.

Drawing transmission of symbols from each of K and K+1 results in an angle of θ between the horizontal distance between K and K+1 and a perpendicular line with the transmission from K. Since only a few CRS symbols are radiated out of each antenna element at each different sub-carrier frequency, the channel estimated is inherently narrow band. Expressing the antenna element sub-array spacing in terms of wavelength and given that the CRS FDMAD pattern is known at the UE, the UE can estimate the angle of departure (AOD) in both azimuth and elevation by simply correlating the channels between the sub-arrays. In some embodiments, the AOD can be calculated as described in the following paragraphs and with reference to the flowchart of FIG. 10.

It is assumed that all of the CRS symbols at different sub-arrays and different frequencies are phase synchronized as they leave the antenna and the UE can measure the relative phase difference between the CRS even though they are at different frequencies. Both of these assumptions can be achieved practically with proper array calibration and receiver design.

Power Delay Profile (PDP) channel estimation assumes that the channel can be described as a sum of multiple paths of different delays and strengths from a single antenna element. The impact of the FDMAD on PDP based channel estimation is now discussed.

To analyze the PDP estimation, a linear horizontal array with N elements spaced $$\frac{\lambda}{2}$$

apart is assumed. A UE is located at θ from bore-sight. These assumptions are illustrated in FIG. 8.

Figure 10:
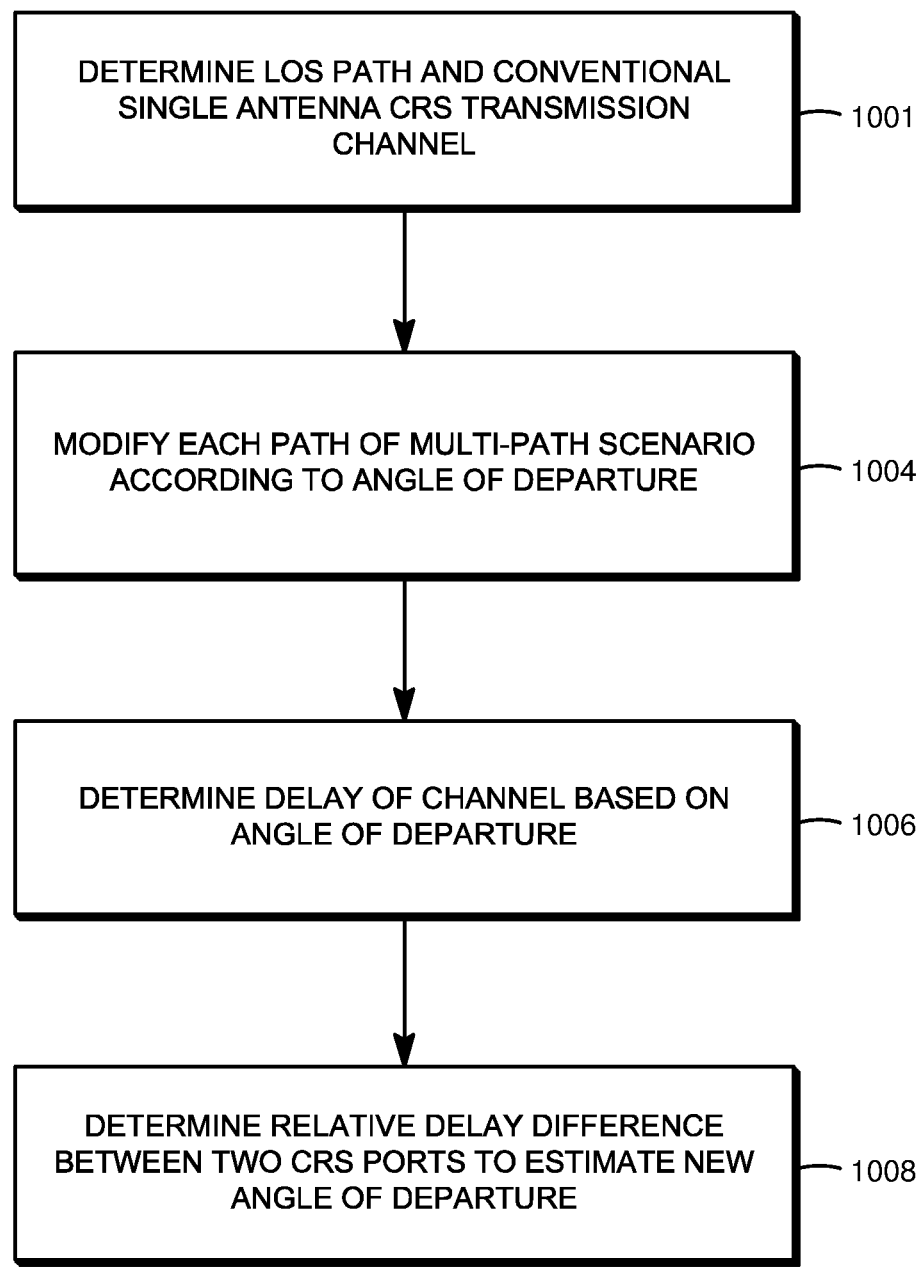
FIG. 10 is a flowchart of a method for determining angle of departure, according to various embodiments.

FIG. 10 is a flowchart of a method for determining angle of departure, according to various embodiments. In block 1001, for the loss of signal (LOS) path and the conventional single antenna CRS transmission, the channel can be described as:

$$h(f) = A e^{j2\pi f \tau_0}$$

where A represents a complex constant, $\tau_0$ is the path delay, and f is the signal frequency.

For FDMAD, if the sub-carrier frequencies are distributed uniformly through the array, the path delay changes with frequency in the following way:

$$\tau(f) = \tau_0 + \frac{\Delta f(N-1)}{2 f_0 BW} \sin\theta$$

$$f \cdot \tau(f) = f\left(\tau_0 + \frac{(N-1)}{2BW}\sin\theta\right) - f_0 \frac{(N-1)}{2BW}\sin\theta + \frac{\Delta f^2 (N-1)}{2 f_0 BW}\sin\theta$$

where f is the frequency of the signal, BW is the bandwidth assigned to each antenna element, τ is the path delay, $\tau_0$ is the path delay at time 0, and N is the number of antenna elements.

The first term simply states that the delay is changed and is assumed to be <375 ns for purposes of illustration only. The $2^{nd}$ term is a constant that causes a simple phase rotation. The $3^{rd}$ term is relatively small, for example, for a 16 column array, 20 MHz carrier at 2 GHz, at the edge of the carrier, it is <0.02, or equal to a 7° phase error.

In block 1004, for a multi-path scenario, each path's delay is modified according to the angle of departure. Therefore, other than a small error, the channel can still be modeled as the sum of multi-paths from a single antenna.

In block 1006, from the previous derivation, it can be seen that the delay of the channel depends on the angle of departure.

$$\tau = \tau_0 + \frac{(N-1)}{2BW}\sin\theta$$

Note that in the previous derivation, the distribution of the sub-carriers is ascending in frequency from the left to the right of the array. Typically, there are two CRS ports for an eNB, each on a different polarization. If the distribution of the first CRS port sub-carriers is ascending in frequency from the left to the right of the array and the distribution of the $2^{nd}$ CRS port sub-carriers is exactly the opposite, namely, descending in frequency from the left to the right of the array, the delay of the $2^{nd}$ CRS port channel may be expressed as:

$$\tau_{CRS2} = \tau_0 - \frac{(N-1)}{2BW}\sin\theta$$

In block 1008, the relative delay difference between the two CRS ports gives a way to an estimated angle of departure:

$$\Delta\tau_{CRS} = \tau_{CRS1} - \tau_{CRS2} = \frac{(N-1)}{BW}\sin\theta.$$

Figure 9:
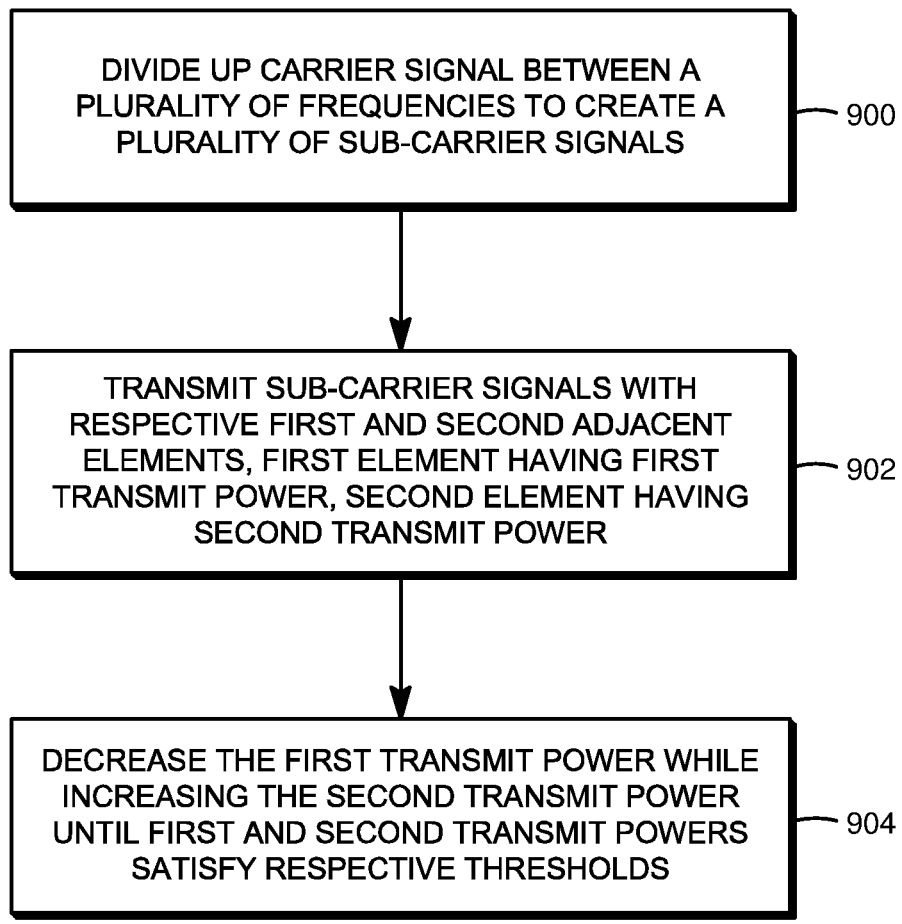
FIG. 9 is a flowchart of a method for FDMAD operation, according to various embodiments.

FIG. 9 is a flowchart of a method for FDMAD operation, according to various embodiments. In block 900, a carrier signal is divided into a plurality of distinct sub-carrier signals, each sub-carrier signal comprising one or more frequencies (e.g., by the controller 200). In block 902, the sub-carrier signals are transmitted with respective first and second adjacent antenna elements, the first antenna element having a first transmission power and the second antenna element having a second transmission power. In block 904, during the transmitting, the first transmission power of the first antenna elements is decreased while increasing the second transmission power of the second antenna elements until the first and second transmission powers satisfy respective thresholds Additionally, in an embodiment, the sub-carrier signals are transmitted with respective third and fourth adjacent antenna elements, the third antenna element having a third transmission power and the fourth antenna element having a fourth transmission power. During the transmitting from the third and fourth antenna elements, the third transmission power of the third antenna elements is decreased while increasing the fourth transmission power of the fourth antenna elements until the third and fourth transmission powers satisfy respective thresholds In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, Application-Specific Integrated Circuit (ASIC), microprocessor, or other type of processor operating on a computer system, such as a personal computer, server or other computer system, turning such computer system into a specifically programmed machine.

Although several embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An apparatus of a base station, the apparatus comprising:
   an antenna array comprising a plurality of antenna elements;
   a plurality of transceivers coupled to the plurality of antenna elements; and
   processing circuitry coupled to the antenna array and the plurality of transceivers, the processing circuitry and the plurality of transceivers configured to perform operations comprising:
      generating a plurality of sub-carrier signals using a carrier signal associated with a frequency band;
      determining a sub-carrier pattern formed from a subset of the plurality of sub-carrier signals, wherein each sub-carrier signal in the subset of the plurality of sub-carrier signals corresponds to a different antenna element in a subset of the plurality of antenna elements;
      moving the plurality of sub-carrier signals within the sub-carrier pattern around the antenna array to transmit the frequency band at a particular antenna element of the subset of the plurality of antenna elements using the plurality of transceivers, each of the sub-carrier signals in the sub-carrier pattern transmitted with a transmission power corresponding to a transmission weight of a plurality of transmission weights; and
      adjusting the transmission power for each of the sub-carrier signals in the sub-carrier pattern, while a same sub-carrier signal of the plurality of sub-carrier signals is transmitted by at least two antenna elements of the antenna array during the moving of the plurality of sub-carrier signals around the antenna array.

2. The apparatus of claim 1, wherein the processing circuitry is configured to perform operations comprising:
   determining the sub-carrier pattern based on a horizontal and vertical cell coverage of a transmission beam pattern within a cell of the base station.

3. The apparatus of claim 1, wherein the processing circuitry is configured to perform operations comprising:
   determining a number of vertical elements in the sub-carrier pattern based on a minimum vertical beam width associated with a cell of the base station.

4. The apparatus of claim 1, wherein the processing circuitry is configured to perform operations comprising:
   determining the sub-carrier pattern based on at least one of the following: a number of user equipments (UEs) within a cell of the base station and a size of the cell.

5. The apparatus of claim 1, wherein during the moving of the plurality of sub-carrier signals around the antenna array the same sub-carrier signal of the sub-carrier pattern is transmitted simultaneously with respective first and second adjacent antenna elements, the first antenna element having a first transmission power associated with a first transmission weight of plurality of transmission weights and the second antenna element having a second transmission power associated with a second transmission weight of the plurality of transmission weights.

6. The apparatus of claim 5, wherein the processing circuitry is configured to perform operations comprising:
   during the moving of the plurality of sub-carrier signals around the antenna array and the simultaneous transmission of the same sub-carrier signal by the first and second adjacent antenna elements, causing decreasing of the first transmission power of the first antenna elements while causing increasing of the second transmission power of the second antenna element until the first and second transmission powers satisfy respective thresholds.

7. The apparatus of claim 6, wherein the processing circuitry is configured to perform operations comprising:

during the transmitting of the same sub-carrier signal, decreasing the first transmission power and increasing the second transmission power comprises decreasing the first transmission power linearly and increasing the second transmission power linearly.

8. The apparatus of claim 1, wherein the processing circuitry is configured to perform operations comprising:
estimating an angle of departure of the sub-carrier signals from corresponding antenna elements.

9. The apparatus of claim 1, wherein the sub-carrier signals are varied by both frequency and time amongst the plurality of antenna elements.

10. The apparatus of claim 1, wherein during the moving of the plurality of sub-carrier signals around the antenna array, the processing circuitry is configured to perform operations comprising:
performing downward shifting of the sub-carrier pattern within the antenna array; and
performing sideways shifting of the sub-carrier pattern within the antenna array.

11. The apparatus of claim 1, wherein the base station is an evolved Node-B (eNB) or a next generation Node-B (gNB) configured to operate in a multiple-input-multiple-output (MIMO) configuration.

12. A method for frequency division multiple antenna distribution of a signal, the method comprising:
generating a plurality of sub-carrier signals using a carrier signal associated with a frequency band;
determining a sub-carrier pattern formed from a subset of the plurality of sub-carrier signals, wherein each sub-carrier signal in the subset of the plurality of sub-carrier signals corresponds to a different antenna element in a subset of a plurality of antenna elements in an antenna array;
moving the plurality of sub-carrier signals within the sub-carrier pattern around the antenna array to transmit the frequency band at a particular antenna element of the subset of the plurality of antenna elements, each of the sub-carrier signals in the sub-carrier pattern transmitted with a transmission power corresponding to a transmission weight of a plurality of transmission weights; and
adjusting the transmission power for each of the sub-carrier signals in the sub-carrier pattern, while a same sub-carrier signal of the plurality of sub-carrier signals is transmitted by at least two antenna elements of the antenna array during the moving of the plurality of sub-carrier signals around the antenna array.

13. The method of claim 12, further comprising:
determining the sub-carrier pattern based on a horizontal and vertical cell coverage of a transmission beam pattern within a cell of a base station; and
determining a number of vertical elements in the sub-carrier pattern based on a minimum vertical beam width associated with the cell.

14. The method of claim 12, further comprising:
transmitting the same sub-carrier signal of the sub-carrier pattern simultaneously with respective first and second adjacent antenna elements, the first antenna element having a first transmission power associated with a first transmission weight of plurality of transmission weights and the second antenna element having a second transmission power associated with a second transmission weight of the plurality of transmission weights.

15. The method of claim 14, further comprising:
during the moving of the plurality of sub-carrier signals around the antenna array and the simultaneous transmission of the same sub-carrier signal by the first and second adjacent antenna elements, decreasing the first transmission power of the first antenna elements while increasing the second transmission power of the second antenna element until the first and second transmission powers satisfy respective thresholds.

16. The method of claim 12, wherein transmitting the sub-carrier signals comprises transmitting cell-specific reference signal (CRS) symbols to at least one user equipment (UE).

17. The method of claim 12, wherein the sub-carrier signals are varied by both frequency and time amongst the plurality of antenna elements.

18. A non-transitory computer-readable media storing computer instructions for frequency division multiple antenna distribution that, when executed by one or more processors, cause the one or more processors to perform operations comprising:
generating a plurality of sub-carrier signals using a carrier signal associated with a frequency band;
determining a sub-carrier pattern formed from a subset of the plurality of sub-carrier signals, wherein each sub-carrier signal in the subset of the plurality of sub-carrier signals corresponds to a different antenna element in a subset of a plurality of antenna elements in an antenna array;
moving the plurality of sub-carrier signals within the sub-carrier pattern around the antenna array to transmit the frequency band at a particular antenna element of the subset of the plurality of antenna elements, each of the sub-carrier signals in the sub-carrier pattern transmitted with a transmission power corresponding to a transmission weight of a plurality of transmission weights; and
adjusting the transmission power for each of the sub-carrier signals in the sub-carrier pattern, while a same sub-carrier signal of the plurality of sub-carrier signals is transmitted by at least two antenna elements of the antenna array during the moving of the plurality of sub-carrier signals around the antenna array.

19. The non-transitory computer-readable media of claim 18, wherein the computer instructions further cause the one or more processors to perform operations comprising:
determining the sub-carrier pattern based on a horizontal and vertical cell coverage of a transmission beam pattern within a cell of a base station; and
determining a number of vertical elements in the sub-carrier pattern based on a minimum vertical beam width associated with the cell.

20. The non-transitory computer-readable media of claim 18, wherein the carrier signal is in a Long Term Evolution (LTE) frequency band, and wherein the sub-carrier signals are transmitted on a downlink channel to a user equipment for cell search and initial acquisition.

* * * * *

UNITED STATES PATENT AND TRADEMARK OFFICE
CERTIFICATE OF CORRECTION

PATENT NO. : 10,594,370 B2
APPLICATION NO. : 16/115349
DATED : March 17, 2020
INVENTOR(S) : Zhengxiang Ma Page 1 of 1

It is certified that error appears in the above-identified patent and that said Letters Patent is hereby corrected as shown below:

In the Claims

In Column 10, Line 51, in Claim 5, after "weights", insert --,--

In Column 12, Line 8, in Claim 15, delete "elements,decreasing" and insert --elements, decreasing-- therefor Signed and Sealed this
Twenty-third Day of June, 2020

Andrei Iancu
*Director of the United States Patent and Trademark Office*